United States Patent [19]
Olson et al.

[11] Patent Number: 5,077,948
[45] Date of Patent: Jan. 7, 1992

[54] POLYMER ENCLOSED DOOR

[75] Inventors: Vernon D. Olson; Allen E. Lee, both of Brookings, S. Dak.

[73] Assignee: Larson Manufacturing Company, Brookings, S. Dak.

[21] Appl. No.: 402,916

[22] Filed: Sep. 1, 1989

[51] Int. Cl.$^5$ .................... E04C 1/00; E04C 2/34; E06B 7/16; B32B 31/24
[52] U.S. Cl. ................... 52/309.9; 52/309.11; 52/309.15; 52/802; 52/805; 52/809; 52/810; 52/DIG. 4; 49/478; 49/501; 156/272.4
[58] Field of Search ............... 52/DIG. 4, 802, 805, 52/810, 309.11, 809, 309.15; 49/478, 501, 368; 156/272.4; 428/1, 63, 71, 116, 447

[56] References Cited

U.S. PATENT DOCUMENTS

| | | | |
|---|---|---|---|
| 3,465,536 | 9/1969 | Vogel et al. | 49/478 X |
| 3,469,349 | 9/1969 | Multer | 49/478 |
| 3,498,001 | 3/1970 | MacDonald | 49/501 |
| 3,512,304 | 5/1970 | Meuret | 49/478 X |
| 3,620,875 | 11/1971 | Guglielmo, Sr. et al. | 156/272.4 |
| 3,786,609 | 1/1974 | Difazio | 52/802 |
| 3,898,120 | 8/1975 | Snitker | 156/284 |
| 3,950,894 | 4/1976 | DiMaio | 49/501 |
| 4,035,547 | 7/1977 | Heller, Jr. et al. | 156/272.4 X |
| 4,132,042 | 1/1979 | DiMaio | 52/309 |
| 4,265,067 | 5/1981 | Palmer | 52/309 |
| 4,271,649 | 6/1981 | Belanger | 52/309 |
| 4,288,135 | 9/1981 | Buchser et al. | 49/368 X |
| 4,327,535 | 5/1982 | Governale | 49/501 X |
| 4,386,482 | 6/1983 | Quinif | 49/488 |
| 4,453,357 | 6/1984 | Zwilgmeyer | 52/309.1 X |
| 4,478,415 | 10/1984 | Shaffer et al. | 52/309.15 X |
| 4,485,590 | 12/1984 | Legg et al. | 49/501 |
| 4,527,544 | 7/1985 | Wolf et al. | 52/503 X |
| 4,550,540 | 11/1985 | Thorn | 52/309 |
| 4,610,119 | 9/1986 | Bench, Sr. | 52/309 |
| 4,643,787 | 2/1987 | Goodman | 52/809 X |
| 4,686,806 | 8/1987 | Bennett | 52/309 |
| 4,720,951 | 1/1988 | Thorn et al. | 52/208 |
| 4,850,168 | 7/1989 | Thorn | 52/805 X |
| 4,922,674 | 5/1990 | Thorn | 52/805 X |

FOREIGN PATENT DOCUMENTS 229750 3/1959 Australia .................... 52/805

OTHER PUBLICATIONS

Advertising brochure for the EMAWELD ® process.

Primary Examiner—David A. Scherbel
Assistant Examiner—Deborah McGann Ripley
Attorney, Agent, or Firm—Kinney & Lange

[57] ABSTRACT

A structure for limiting access, such as a storm door, having first and second polymer shells with at least one thereof having side shell portions extending at an angle from a major shell portion with these side shell portions adjoining the other shell, there being a first distribution of magnetic particles positioned between a polymer backing and both the first and second shells. The backing can be fused to the shells to provide a single unit outer structure with the magnetic particle distribution being substantially in the fused portion. These magnetic particles extend in the fused portion around substantially the entirety of a major shell portion. The space between the two shells in that situation can have elongated members enclosed therein which are not fastened to one another by anything extending into such members, and the remainder of this space may be filled with an expanded polymer foam. Another distribution of a different kind of magnetic particles may be positioned at a surface of a major portion of one of the shells.

50 Claims, 4 Drawing Sheets

POLYMER ENCLOSED DOOR

BACKGROUND OF THE INVENTION

The present invention relates to structures, such as doors, for controlling passageways, through openings in structural walls where such control structures are formed with outer coverings of a polymeric material and, more particularly, to such structures which must withstand extremes of temperature and other environmental factors.

Building structures are erected to separate the contents and inhabitants thereof from the external environment. Access control means in openings provided in such building structures, including windows and doors, control the passage of air, water, people and numerous other entities into and out of such a structure.

Such doors and windows must have a close fit within the frames provided therefor in these structural building openings if they are to successfully control passage of substantially all air and water therethrough. Doors must also be sufficiently strong to withstand substantial bumping as various kinds of objects are moved near and through the passageway in which the door is provided, to withstand slamming by users of the door, etc. Both doors and windows must withstand buffeting by storms, and also must remain operable over what are often extensive temperature ranges. In addition, they must withstand the deteriorating effects of great variations in weather over long periods of time while, in many instances, also retaining acceptable appearance characteristics.

As a result, a number of different kinds of materials have been used for exterior doors and windows, such as storm doors, in efforts to provide satisfactory designs for these needs. Thus, storm doors have been constructed of assembled wooden parts, aluminum parts, or vinyl parts, and often of combinations of these materials. In addition, various other polymer-based materials have been used.

The door and window structures resulting from the use of these materials have had various shortcomings most often caused by the undesirable structural and thermal characteristics of the materials being used or by the construction methods employed in using these materials. Some of the materials so used have had, for instance, an unacceptably large coefficient of thermal expansion. Such coefficients prevent the products formed from them from having close fits in structural opening frames with small tolerances over various temperature and weather conditions, and further, lead to door warpage particularly in the presence of temperature gradients. A storm door can not only experience in use at times temperatures of 40° to 50° F. below zero, but can at other times be subjected to temperatures which will be 140° F. on an exterior surface in direct sunlight and 200° F. on an interior surface due to a "greenhouse effect" occurring between the storm door and the entry door in a building.

With such temperature ranges, excessive coefficients of thermal expansion mean the doors cannot be closely fitted in the frames or there will be insufficient room for thermal expansion and contraction. Too close a fit will lead to the door sticking, warping or otherwise bending. Yet, large tolerances in the fit between the door and the frame mean that undesired passage of air from one side of the door to the other is unavoidable. Even with large tolerances in the fit, temperature differences can occur in the door which will still lead to its sticking, warping or otherwise bending.

Various construction techniques have been applied in forming doors and windows in attempts to overcome the shortcomings therein due to the materials used. Such techniques often involve additional fasteners or stiffening means which must be incorporated and usually lead to increased costs.

In these circumstances, access control means such as doors are desired which will be capable of being installed with a close fit between themselves and the frames about the structural wall openings for which they are provided, and which can be maintained in all weather conditions including extreme temperature ranges. The outer surfaces thereof should be able to be embossed to have an appearance which is compatible with other materials being used in the building structure for the siding, facia, soffits, etc. Yet these surfaces should be resistant to deterioration or physical damage, and to moisture, while retaining protective and decorative coatings provided thereon to thereby minimize required maintenance efforts. Parts of some access control means at or near such surfaces should be magnetizable to permit use thereof with magnetic weather stripping. Further, the structures used for such items should not require use of unduly expensive fabrication methods and materials.

SUMMARY OF THE INVENTION

The present invention provides a structure for an access limiting means, such as a storm door, having first and second polymer shell means with at least one thereof having side shell portions extending at an angle from a major shell portion with these side shell portions adjoining the other shell means, there being a first distribution of magnetic particles positioned between polymer backing means and both the first and second shell means. The backing means can be fused to the shell means to provide a single unit outer structure with the magnetic particle distribution being substantially in the fused portion. These magnetic particles extend in the fused portion around substantially the entirety of a major shell portion. The space between the two shell means in that situation can have elongated members enclosed therein which are not fastened to one another by anything extending into such members, and the remainder of this space may be filled with an expanded polymer foam. Another distribution of a different kind of magnetic particles may be positioned at a surface of a major portion of one of the shell means, these distributions of differing kinds of magnetic particles leading to one being more capable of absorbing electromagnetic radiation of selected type than the other.

BRIEF DESCRIPTION OF THE PREFERRED EMBODIMENTS

Figure 1:
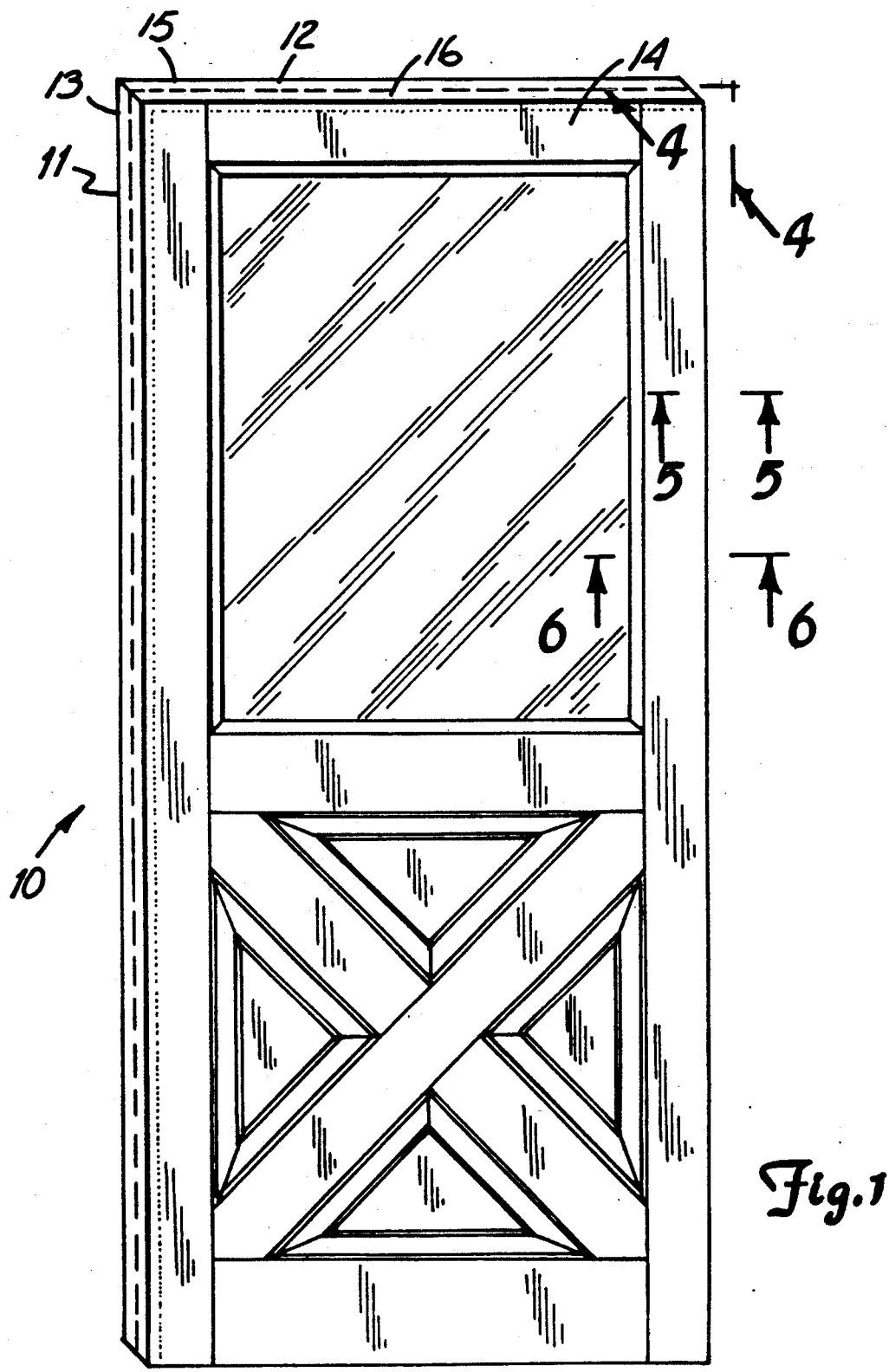
FIG. 1 shows a pictorial view of a door embodying the present invention.

A storm door, 10, as an access limiting means for a building structure opening is shown in the pictorial view of FIG. 1. Door 10 has a polymer based pair of shell halves, 11 and 12, fused together to form the outer covering of the door except where openings are provided for door hardware and a window. Exterior polymer material shell half 11 has a major shell portion, 13, and interior polymer material shell half 12 has a major shell portion, 14. Shell half 11 has side shell portions, 15, and shell half 12 has side shell portions 16.

Polymer material shell halves 11 and 12 are formed of a polymer composite material which is a so-called "engineered material" having a polymer matrix hosting a selected fiber therein to primarily carry loads imposed on the material. Careful engineering and fabrication allow providing a polymer composite which is isotropic in its behavior characteristics under load, and which also behaves isotropically with respect to other characteristics.

Such carefully engineered material being selected for door 10 provides that door with considerably improved properties with respect to earlier polymer material covered doors. The polymer composite chosen for shell portions 11 and 12 of door 10 has, as a matrix material, a thermoplastic, polypropylene, which is filled substantially throughout, essentially to each exposed surface thereof, with fibers of fiberglass. These fibers are relatively long to the point of being termed "continuous strand" and are oriented randomly in the plastic matrix. The specific material selected for shell portions 11 and 12 is designated AZDEL® P-100 (30% fill) and is available from AZDEL, Inc., of Detroit, Mich. This polymer composite has been chosen because of its suitable properties for use in an access limiting means such as storm door 10.

In particular, this polymer composite has a thermal coefficient of expansion which is sufficiently similar to that of both wood and aluminum to be usable therewith. Such coefficients of thermal expansion are well known to be sufficiently small to avoid having such a door stick or warp even though a sufficiently close fit is provided therefor in a frame in a building structural opening to eliminate unwanted passage of air or water past such a door. In addition, such coefficients are sufficiently small to avoid warping from differential heating of the door between its inner side and its outer side.

This polymer composite also has a high impact strength to withstand mechanical abuse as well as high tensile strength to withstand loads and to give the material sufficiently low creep so that it will hold screws driven therein. A high flexural modulus for the material over a significant temperature range keeps the door relatively stiff, and even when bent by winds forcing the door against its safety chain or because of slamming, the shells will return to their original shape upon removal of such loads. Further, the surface of such a material can be embossed to have a desired pattern and, after priming, will accept a high quality painted finish to resist ultraviolet radiation in sunlight, and both water and cleaning products.

Figure 2:
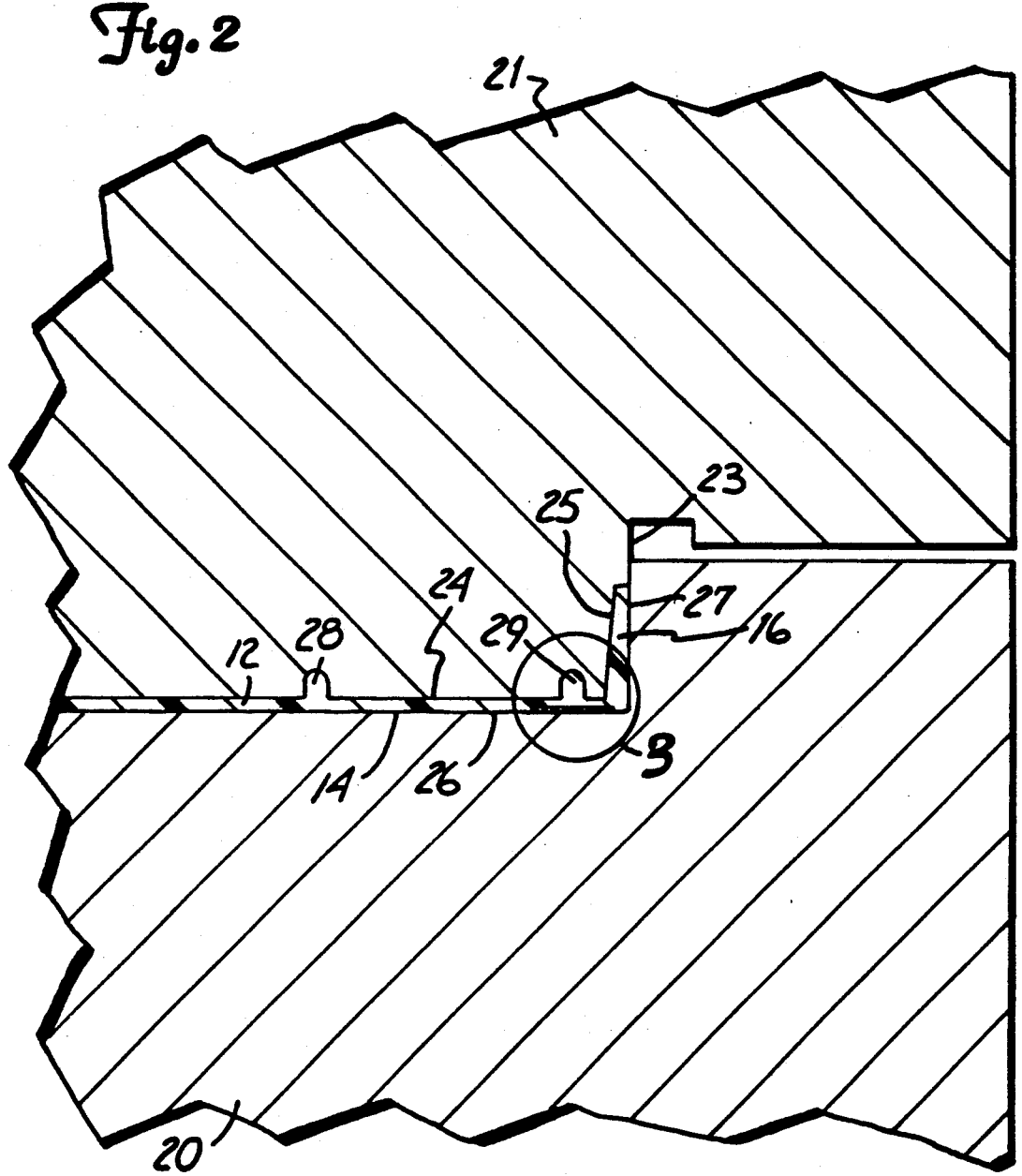
FIG. 2 shows a cross section view of apparatus used in forming portions of door of FIG. 1.

Polymer composite shell halves 11 and 12 can each be formed of this polymer composite using the same matched metal compression mold, a portion of which is shown in FIG. 2. A female die, 20, is shown on the bottom of FIG. 2 engaged by a male die, 21, shown on the top in that figure. Before dies 20 and 21 are so engaged, a properly sized sheet of the polymer composite feedstock, preheated to a selected temperature in the range of 80° to 150° F., is placed in the cavity of die 20.

Also placed in that cavity for molding a shell half 12 only (the example shown in FIG. 2) is an extruded strip of synthetic rubber, 22, containing ferromagnetic particles available from Pantasote, Inc. of Seymour, Ind. under the compound designation 527028 which can be ordered in various specified geometrical forms. These ferromagnetic particles have a typical size of 1.5 to 2.5 μm with a suitable retentivity to be permanently magnetized. These particle characteristics are important in assuring that they do not absorb too much electromagnetic energy from a selectively provided oscillating inductive magnetic field used in an induction "welding" process to be described below. These ferromagnetic particles are provided with a net magnetization so that they in strip 22 are attracted to and held to a significant extent against, the high quality tool steel used for fabricating die 20 (and die 21).

Both die 20 and die 21 have a textured surface thereon so as to be able to impart a wood grain texture to the surface of the polymer composite material molding results which become shell halves 11 and 12. Rubber strip magnet 22 is placed in direct contact with the textured surface of die 20 if a shell portion 12 is being molded, and is sufficiently attracted thereto to remain in place during compression molding as the polymer composite material flows above it and a portion of the polymer material therein flows below it.

The thickness of rubber magnet strip 22 is 0.030 in., and it is 0.5 in. in width. These dimension for strip 22 allow the polymer composite material to flow above the strip, with a part of the polymer component thereof flowing below it, thereby encapsulating this strip within shell portion 12 very near the front surface thereof (0.005-0.010 in.) but still with textured polymer component material being provided in front thereof assuring such encapsulation. The polymer not only flows around that strip, but also the polymer composite flows past that strip into the portion of the molding space between dies 20 and 21 providing side shell portions 16.

This flow occurs even for the low temperatures of 80° F. to 150° F. used during molding because of the large compressive force provided between dies 20 and 21, this force being on the order of 2,000 tons. This large force also serves to assure that the surface texture provided for in dies 20 and 21 is well formed in the surface of the finished polymer composite forming shell halves 11 and 12. Rubber magnetic strip 22 has a similar molding temperature as does the composite polymer so that it gives under compression in the textured regions much as does the composite polymer to thereby also result in well formed texturing occurring in the polymer component material in the region of shell half 12 in which strip 22 is provided.

The fit between the overlapping edge portions, 23, of dies 20 and 21 at the top of the cavity for side shell portions 16 must be very close to prevent flows past these locations during molding. Thus, a rubber base for magnetic strip 22 is chosen for being encapsulated in shell half 12 as it will also help to prevent damage to these dies should that strip inadvertently be erroneously positioned in this location and so partially squeezed between these two dies. The dies for making shell halves 11 and 12 are quite large and therefore are quite expensive, and avoiding such damage is, as a result, quite important. The use of a rubber base for magnetic strip 22 also avoids excessive wear of the textured surfaces of die 20 which, if it occurred, would adversely affect the textured look of these shell portions in this region in shell halves 11 and 12 fabricated in the future.

Figure 3:
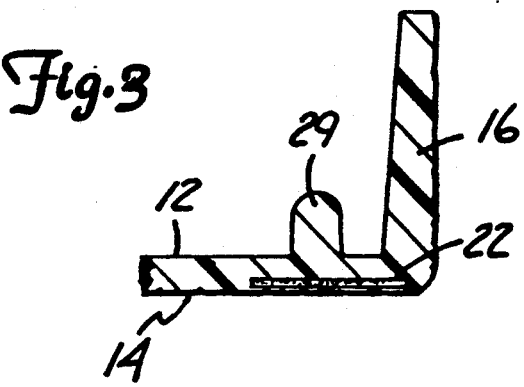
FIG. 3 shows a fragmentary view of a portion of the view in FIG. 2.

The final result of the molding process leading to the encapsulating of a rubber magnet strip 22 in a shell half 12 is shown in FIG. 3 which is a fragmentary view taken from the shell half 12 portion shown in FIG. 2 after its removal from die 20. As encapsulated, this rubber magnet strip is redesignated 22' in that figure.

Achieving good flow of the polymer composite, including the glass strand filler, past magnetic strip 22 and up into the space between dies 20 and 21 in which side shell portions 15 and 16 are formed for shell halves 11 and 12, respectively, is a demanding requirement. That desired result is further aided to come about by enlarging the space for such flow at the point of transition from a major portion of a shell half to its side shell portion. Thus, the surface, 24, of male die 21 which is used to form major portions of shell halves 11 and 12 has the surface, 25, of mold 21 forming the primary part of the side shell portions therein provided at an angle of approximately 94° with respect thereto. Because of this, the resulting side shell portions in each shell half will be thicker where joined with the major shell portion of that shell half due to the added space such an angular relationship provides which additional space promotes flow of the composite polymer into the mold space used to form the side shell portions by relaxing conditions restricting such flow.

The angle between the surface, 26, in mold 20 for providing the major shell portion for shell halves 11 and 12, and the primary surface, 27, used for providing the side shell portions therein, is set at about 91° to aid in removing shell halves 11 and 12 from die 20 after completing the formation thereof. Further provisions to aid in promoting the flow of the composite polymer are the provisions of a radius of 0.60 in. at the junction of surfaces 26 and 27 in die 20, and a radius of 0.015 in. at the junction of surfaces 24 and 25 in mold 21. The length from a major shell portion exterior surface to the end of its side shell portion is typically 0.75 in. for a 1.5 in. thick version of door 10, and its side shell portion extends around the entire periphery of the major shell portion.

The thickened base portions of side shell portions 15 and 16, where extending from major shell portions 13 and 14 of shell halves 11 and 12, and which resulted from the mold cavity enlargement provided for the purpose of promoting flow of the composite polymer during molding, have a further consequence. Upon completion of the compression molding of such a shell half, die 21 is disengaged from die 20 and cooling of the shell half 11 or 12 so molded continues, even well after its removal from die 20. Because side shell portions 15 and 16 are thinner at the ends thereof than they are at the bases thereof, both the differing cooling rates therein and the increased total shrinkage which comes with increased amounts of material cause these side shell portions to tilt inward up to a few degrees toward the corresponding major shell portion. This slightly inward orientation of side shell portions 15 and 16 is important in assuring the success of the induction "welding" process, mentioned above and which will be described below, for joining shell halves 11 and 12 together without the need for any fixturing whatsoever.

As can be seen in FIG. 2, a pair of positioning ribs, 28 and 29, are provided extending inward from major shell portions 13 and 14 of shell halves 11 and 12. Positioning ribs 28 and 29 are spaced apart from one another and spaced apart but near side shell portions 15 or 16 of shell halves 11 or 12, respectively, along the top and bottom of door 10 and both of its sides. Positioning ribs 28 and 29 are provided parallel to the corresponding side shell portions and extend nearly to the corners of door 10.

Figure 4:
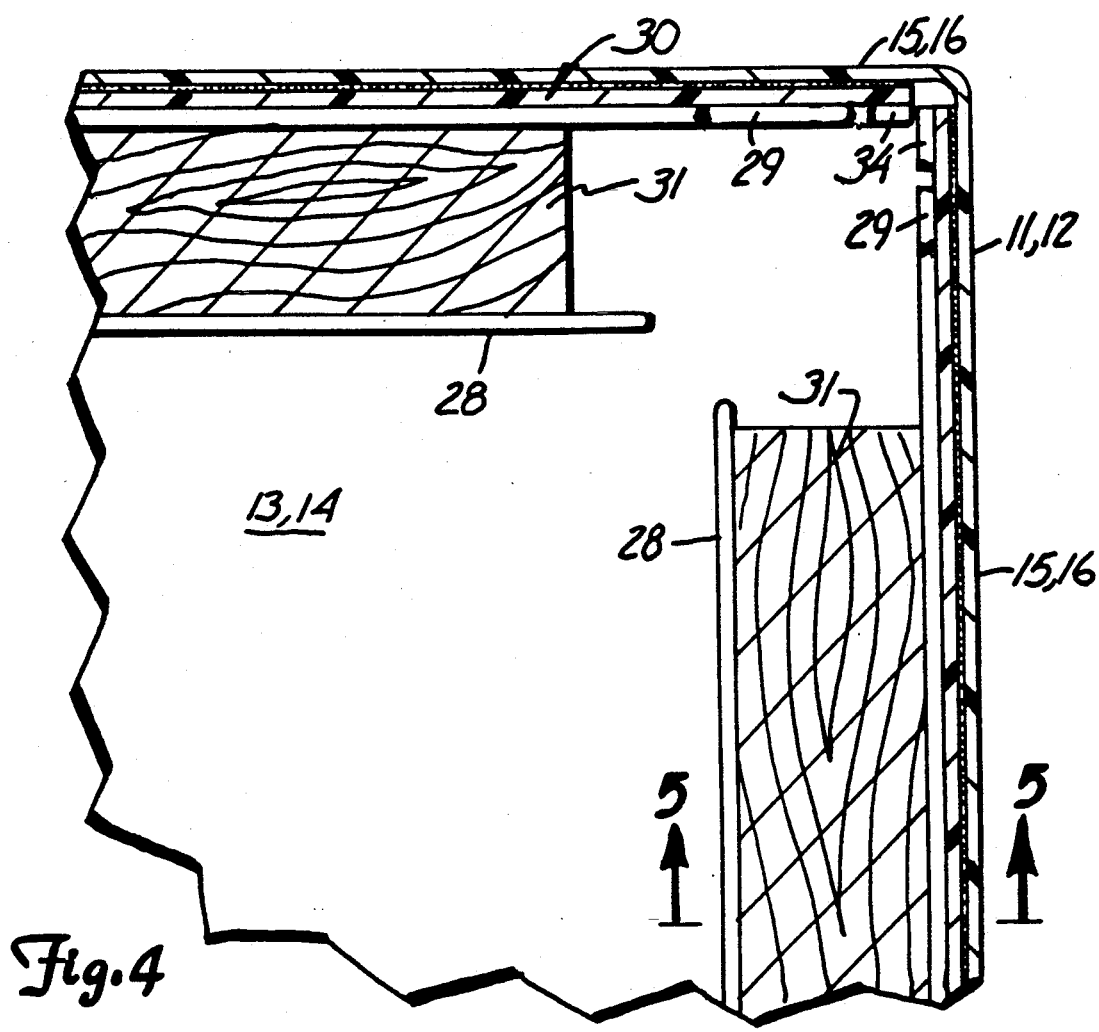
FIG. 4 shows a cross section view of a portion of the view in FIG. 1 before all fabrication steps have been completed for the structure shown there.

This is more easily seen in FIG. 4 which represents a partial cross section view of door 10 taken from FIG. 1 showing the interior of a shell half 11 or 12 at one corner of that door. The extent of positioning ribs 28 can be clearly seen. The extent of positioning ribs 29 can also be clearly seen since portions of an induction welding backing strip, 30, which would cover them in this view have been broken away.

Additionally shown in FIG. 4 are backing supports, 31, which are placed between positioning ribs 28 and 29 where they are thus carefully positioned to be in contact with backing strip 30. Four such backing supports 31 are provided, one at the top and one at the bottom of door 10 and one at each side thereof. Whichever shell half interior is shown in FIG. 4, whether an exterior shell half 11 or an interior shell half 12, the opposite kind of shell half fits thereover so that its positioning ribs 28 and 29 also fit about backing supports 31 which thus serve to generally align shell halves 11 and 12 with one another. No other holding means are forced into backing supports 31 to form any sort of frame, i.e. there are no fasteners extending into supports 31 to form them into a rectangular frame or to fasten them to shell halves 11 or 12.

Figure 5A:
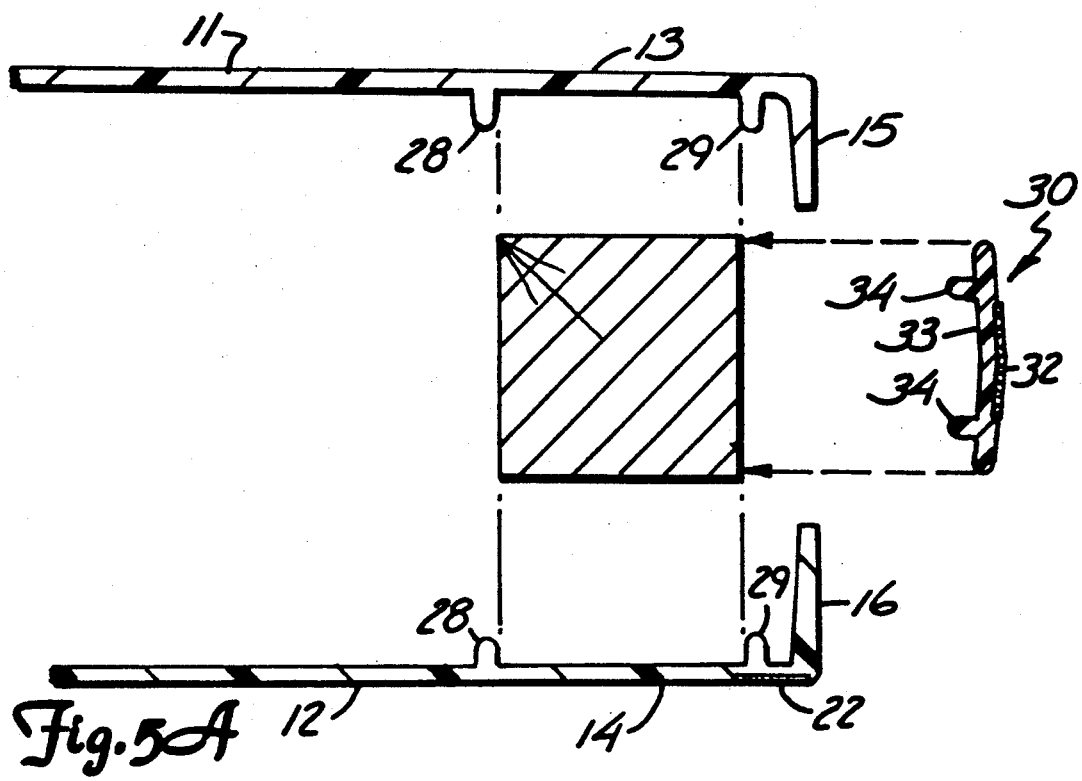
FIGS. 5A, 5B and 5C show cross section views of a portion of the view in FIGS. 1 and 4 before all fabrication steps have been completed for the structure shown there.

This arrangement is more easily seen in FIG. 5 which provides a sequence of figures showing the assembly of shell halves 11 and 12 together to form door 10 including assembling them with backing strips 30 and backing supports 31 FIG. 5A is an exploded cross sectional view of a part of door 10 from FIGS. 1 and 4 near that edge thereof in which is provided encapsulated rubber magnet 22'. Backing support 31 is typically chosen to be a wooden beam made of a hardwood such as maple and typically formed with a square cross section 1.3 in. on a side for a 1.5 in. thick door.

Backing strip 30 is a co-extruded polymer strip having a distribution of ferromagnetic particles, 32, in a polypropylene carrier together co-extruded with a polypropylene support strip, 33. Ferromagnetic particles 32 in the polypropylene carrier structure, which is fused with support strip 33, stands out approximately 0.010 in. from the surface of support strip 33. Support strip 33, shown in FIG. 5A, has its upper portion provided at an angle with respect to its lower portion, this angle being typically 4°. In addition, a pair of positioning ribs, 34, extend from the left side of support strip 33 in FIG. 5A.

Figure 5B:
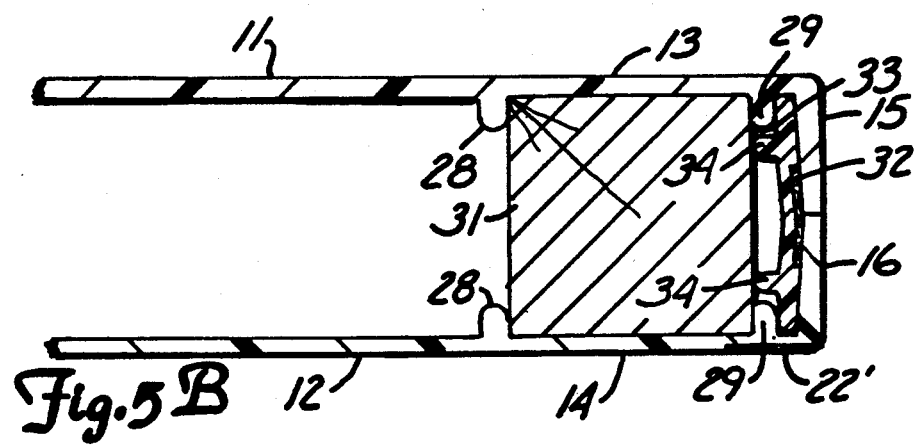

The 4° angle between the upper portion of support strip 33 and the lower portion thereof would allow it to fit easily against side shell portions 15 or 16 if they followed the 4° surface angle set therefor by male die 21 of FIG. 2. However, since the thicker material at the point where these side shell portions are joined with their corresponding major shell portions 13 and 14, respectively, leads to the side shell portions having been tilted inward, the insertion of backing strip 30 between positioning ribs 29 and side shell portions 15 and 16 causes the top and lower portions of support strip 33 to be bent around the interface location where side shell portions 15 and 16 meet, as is shown in FIG. 5B. Thus, positioning ribs 29 in shell halves 11 and 12 press against the end portions of support strips 33 forcing their centers, across which magnetic particles 32 are distributed, against side shell portions 15 and 16 where they meet. Each support strip 33 has its top and bottom portions bent forward by positioning ribs 29 around its center portion where magnetic particles 32 occur. As a result, this situation causes the center portion of support strip 33 in each backing strip 30 to be compressed against side shell portions 15 and 16.

In addition, backing support 31 is located a carefully controlled distance from side shell portions 15 and 16 through its position being determined by positioning ribs 28 and 29. Positioning ribs 34 of support strip 33 are just long enough to be pressed against the remaining portions of strip 33 by backing support 31 to further urge its center portion, and so backing strip 30, against side shell portions 15 and 16.

This arrangement, shown in FIG. 5B, results in having shell halves 11 and 12 properly positioned with respect to one another so that their side shell portions 15 and 16, as tilted inward, are forced outward an equal distance from backing supports 31 to thereby just meet one another because of this outward force transmitted through backing strip 30 being directed against this inward tilt. Since this force balance to achieve this uniform separation between backing supports 31 and side shell portions 15 and 16 occurs around the entire periphery of door 10 at the interior of its side shell portions, shell halves 11 and 12 become very well aligned as they are assembled in the structure shown in FIG. 5B.

The initial inward tilt of side shell portions 15 and 16 assures that all parts thereof tilt inward. Thus, although some parts may not tilt inward as much as others, the results which would otherwise occur would be to have some portions tilt inward and some portions tilt outward in the absence of adding material at the bases of these side shell portions to cause such inward tilt. As a further consequence of this backing strip 30 balance of forces with side shell portions 15 and 16, magnetic particles 32 in the polypropylene carrier on support strip 33 are forced against side shell portions 15 and 16 where they meet, although the amount of force may differ from place to place along this interface.

The assembly in FIG. 5B is then ready for the induction "welding" process for the purpose of fusing side shell portions 15 and 16 together. That assembly is loaded between two parallel sets of successive "above and below" compressive roller pairs, one set positioned on each of two opposite sides of door 10, and forced between successive compressive roller pairs in these two sets past an induction "welding" head. The compressive forces provided by these roller pairs keep the ends of side shell portions 15 and 16 against one another both before and after the "welding" takes place, these forces being limited by the adjacent backing support 31. The remaining two opposite sides of door 10 are thereafter also placed between two parallel sets of successive compressive roller pairs and forced between successive roller pairs of these two sets past an inductive "welding" head to thereby subject all of side shell portions 15 and 16 to the "welding" process.

An oscillating inductive field provided by the induction "welding" head of a selected field geometry, intensity and frequency (typically 3 to 8 mHz) is generated from this head to transfer electromagnetic energy to magnetic particles 32 to cause heating in their immediate vicinity. Magnetic particles 32 have a typical particle size of 0.020 in. with a suitable permeability to readily absorb energy from the oscillating magnetic field provided by the induction welding head, as opposed to the much smaller magnetic particles in rubber magnet 22' which absorb relatively little of that energy. Magnetic particles 32 in the polypropylene carrier is a combination available from Emabond Systems Division of Ashland Chemical Company of Norwood, N.J. under the designation Emabond G10-406.

In addition to differing particle sizes, the much higher electromagnetic energy absorption by particles 32 comes about because the "welding" head is positioned much closer to them than it is to rubber magnet 22' and because of the differing orientation of the magnetic or inductive field through each. The field geometry, though the field is oscillating in intensity and direction, always has at magnetic particles 32 a major component thereof parallel to the major cross section dimension of support strip 33 and the distribution of magnetic particles 32 thereon, but at rubber magnet 22' the major component of the field is perpendicular to the major cross section dimension thereof. A parallel component greatly aids the absorption of field energy. Further, the type of magnetic particles in rubber magnet 22', being able to be permanently magnetized, are less susceptible to the effects of the oscillating magnetic field.

These differing energy absorption rates permit setting the rate at which door 10 passes the "welding" head such that regions around magnetic particles 32 heat significantly while little heating occurs around rubber magnet 22'. This difference is aided further by the lower rate at which the synthetic rubber used in rubber magnet 22' takes up the field generated heat than does the polypropylene used in carrying magnetic particles 32.

Thus, the rate at which the side shell portions 15 and 16 pass the induction "welding" head determines the amount of heating which occurs therein for unchanging induction field characteristics. This passage rate is controlled so that a temperature in the range of 400° F. to 420° F. will be generated in the immediate vicinity of those portions of magnetic particles 32 subjected to the primary portion of the inductive field while there is a relatively small temperature increase in rubber magnet 22'.

Figure 5C:
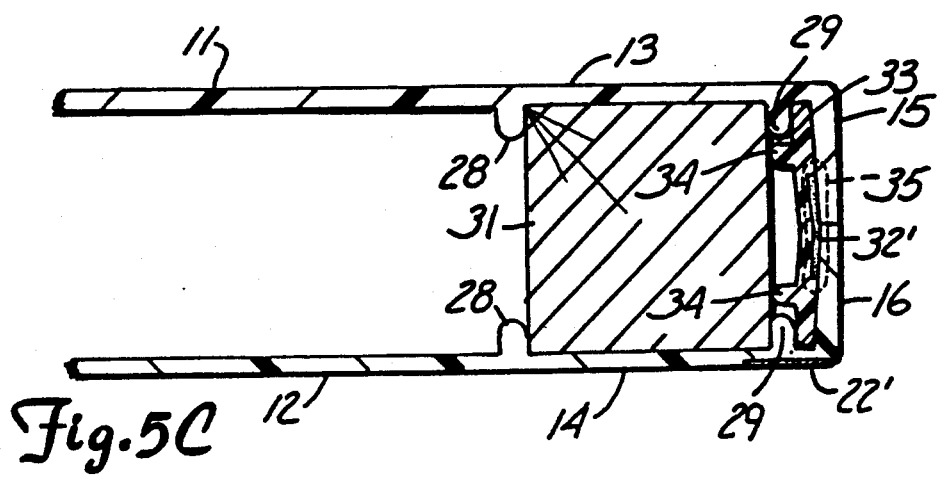

Such temperatures around those portions of magnetic particles 32 are sufficient to cause the polypropylene interspersed around those magnetic particles, the polypropylene immediately adjacent thereto in support strip 33, and the polypropylene at the ends of side shell portions 15 and 16 to melt and fuse together to form a solid fused polypropylene region, 35, designated by dashed lines in FIG. 5C. Magnetic particles 32 after such fusion are primarily distributed in fused region 35 and will have somewhat different positioning as a result of some polypropylene flow thereabout and so have been redesignated 32'. After all of side shell portions 15 and 16 have passed such an induction welding head, fused region 35 will extend around the entire periphery of door 10. Door 10 is kept between the sets of compressive roller pairs used as it passes an inductive "welding" head for some distance past that head so that cooling after the heating is sufficiently complete for the correct fusion bond to form before removal of the roller compressive forces maintaining the proper relative positions of shell halves 11 and 12. The resulting fusion bond is sufficient to prevent moisture from passing therethrough.

This construction, having backing strips 30 with magnetic particles 32 initially distributed thereon together positioned inside side shell portions 15 and 16, provides a supply of polypropylene for the fusion bond of side shell portions 15 and 16. Because of the high glass strand content of side shell portions 15 and 16, there may well be insufficient polypropylene present to provide a sufficient bonding for the two ends thereof to bond to one another. Thus, support strips 33 of backing strip 30 and the polypropylene in which magnetic particles 32 are initially provided, neither of which have any significant amount of fiberglass contained therein, provide a ready source of polypropylene for the fusion bond while permitting side shell portions 15 and 16 to have a high glass strand content to thereby maintain their structural strengths. Of course, the fusion of support strip 33 in the fusion bond along with side shell portions 15 and 16 provides an added bond strength at the joint interface of these two side shell portions by being bonded thereacross.

Since the heating of side shell portions 15 and 16 and support strip 33 of backing strip 30 is quite localized near magnetic particles 32, and since these particles are initially positioned on the interior of side shell portions 15 and 16, relatively little heat reaches the outer surface of side shell portions 15 and 16. This permits shell portions 11 and 12 to have the outer surfaces thereof primed and painted before the "welding" together of these portions occurs. The heat that is generated in the "welding" process is generated far enough from the painted surface in these circumstances so that the temperatures there do not rise so far as to damage the paint or the bond between the paint and these surfaces.

Upon completion of the joining of shell halves 11 and 12 by the fusion bond in region 35, the interior space resulting from joining these two halves together, the portion thereof not taken up by backing supports 31 and backing strips 30, can be filled with a rigid, expanded polymer foam. This can be accomplished by providing an access hole through the bonded structure, such as at the bottom side shell portions, and inserting a nozzle from which the foam constituents are supplied and foaming-in-place occurs to fill that remaining interior space. The access opening provided for such foaming may thereafter be left open or a sealing material may be placed therein. The resulting foam fills this interior space to increase the rigidity of the door and to further bond the components thereof to one another. The interior of shell halves 11 and 12 may be primed to aid in this bonding. Polyurethane foam has been found suitable for these purposes.

The result of these construction steps is an extremely rigid door panel capable of excluding moisture from its interior to thereby avoid interior deterioration. Excellent paints can be used in the pre-painting of the door, as noted above, and so exterior weather damage can also be avoided. The toughness of the polymer composite gives it an excellent capability to withstand mechanical abuse, and to also hold screws for hinges and other door hardware.

Figure 6:
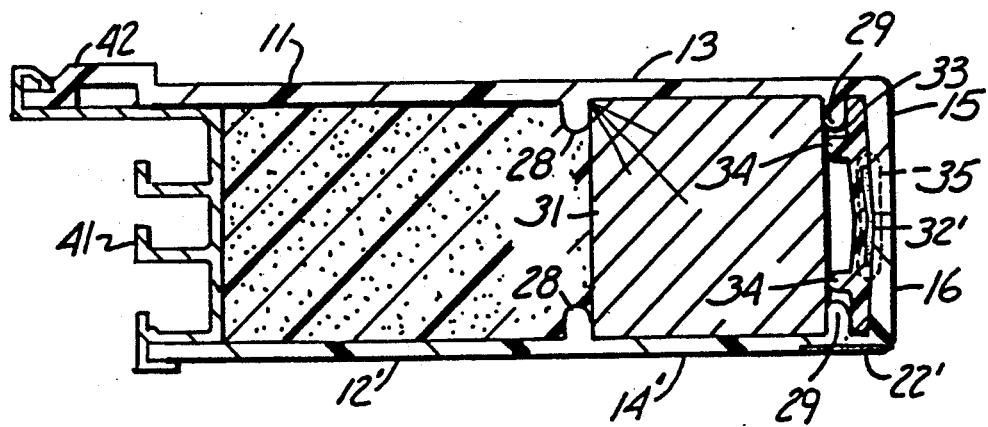
FIG. 6 shows a cross section view of a portion of the view in FIG. 1.

The foaming process described above is sufficient if door 10 has no window opening provided therein. However, a window, 40, is shown in FIG. 1 where it is held in place in the opening through the use of a window frame, 41. To provide such a window, window frame 41 must be installed in the opening provided in shell halves and 12 opposite one another to more or less seal the interior space between those remaining portions of shell halves 11 and 12. The result is seen in the cross section view of FIG. 6 where window frame 41, a version suitable for multiple glass panes, is shown with the edges of major portions 13 and 14 of shell halves 11 and 12 positioned in slots on the right-hand thereof. Major portion 13 of shell half 11 has a decorative raised portion, 42, surrounding the window opening. As shell half 12 is made in the same mold as shell half 11, such a decorative strip is initially present in shell half 12. However, this decorative strip is trimmed off of shell half 12 before the "welding" process. As a result, shell half 12 and major portion 14 thereof have been redesignated 12' and 14' in FIG. 6, although not in FIG. 1.

Once window frame 41 is in place to thereby close off the interior space between shell halves 11 and 12', the foaming operation proceeds as described above (some fixturing with respect to holding this frame in place during molding may be required). The resulting foam, 43, fills this interior space to increase the rigidity of the door and to further bond the components thereof to one another. The interior of shell halves 11 and 12' may be primed to aid in this bonding. Polyurethane foam has been found suitable for these purposes.

Although the present invention has been described with reference to preferred embodiments, workers skilled in the art will recognize that changes may be made in form and detail without departing from the spirit and scope of the invention.

What is claimed is:

1. A structure for an access limiting means for openings in structural walls, said structure comprising:

first and second shell means each formed of a selected polymer and each having a major shell portion with at least said first shell means also having side shell portions extending from, and located peripherally about, said major shell portion thereof in an angular relationship therewith, said first shell means side shell portions adjoining said second shell means;

a backing means formed of a selected polymer positioned adjacent said first shell means side shell portions where they adjoin said second shell means; and a first distribution of a first type of magnetic particles positioned substantially between said backing means and both said second shell means and said side shell portions of said first shell means where they adjoin said second shell means.

2. The apparatus of claim 1 wherein said second shell means also has side shell portions extending from, and located peripherally about, said major shell portion thereof in an angular relationship therewith, said first shell means side shell portions adjoining said second shell means, as aforesaid, at said second shell means side shell portions.

3. The apparatus of claim 1 wherein said backing means is fused with said first shell means side shell portions where adjacent to one another to form a substantially continuous polymer fused portion connecting them together, said first distribution occurring substantially within said fused portion.

4. The apparatus of claim 1 wherein said backing means is forced against said first shell means side shell portions.

5. The apparatus of claim wherein a second distribution of a second kind of magnetic particles is substantially positioned near a surface of said major shell portion of a selected one of said first and second shell means.

6. The apparatus of claim 1 wherein said major shell portions of said first and second shell means each have an insert opening provided therein opposite one another, said insert openings having an insert structure placed therein extending between said first and second shell means major shell portions adjacent at least an edge of each of said insert openings.

7. The apparatus of claim 2 wherein said first and second shell means side shell portions extend peripherally about substantially all of that said major shell portion from which they extend so that an interior space occurring between said first and second shell means major shell portions is substantially surrounded by said first and second shell means side shell portions together.

8. The apparatus of claim 3 wherein said second shell means also has side shell portions extending from, and located peripherally about, said major shell portion thereof in an angular relationship therewith, said first shell means side shell portions adjoining said second shell portions, as aforesaid, at said second shell means side shell portions.

9. The apparatus of claim 3 wherein said backing means and said first shell means side shell portions are also fused with said second shell means where said first shell means side shell portions adjoin said second shell means so that said fused portion is formed as a substantially continuous polymer portion connecting all of them together.

10. The apparatus of claim 4 wherein a first alignment projection extends from a surface of a said major shell portion of at least one of said first and second shell means toward that one remaining, and said backing means being positioned at least in part between said first alignment projection and said first shell means side shell portions.

11. The apparatus of claim 4 wherein said first shell means side shell portions are substantially thicker in parts thereof near where they extend from said first shell means major shell portion than they are in parts thereof near where they adjoin said second shell means.

12. The apparatus of claim 5 wherein an average of a measure of size of said first kind of magnetic particles differs from an average of said measure of size of said second kind of magnetic particles to an extent sufficient that electromagnetic energy of selected characteristics applied concurrently to both of said first and second distributions will be absorbed by said first distribution of said first kind of magnetic particles to a much greater extent than it is absorbed in said second distribution of said second kind of magnetic particles.

13. The apparatus of claim 6 wherein said insert structure is adjacent all of said edges of each of said insert openings.

14. The apparatus of claim 7 wherein said major shell portions of said first and second shell means each have an insert opening provided therein opposite one another with that space between said insert openings being excluded from said interior space, said insert openings having an insert structure placed therein extending between said first and second shell means major shell portions adjacent at least an edge of each of said insert openings.

15. The apparatus of claim 7 wherein said interior space is substantially filled with an expanded polymer foam.

16. The apparatus of claim 7 wherein said interior space has a plurality of elongated members therein each free of any fastening means extending thereinto.

17. The apparatus of claim 8 wherein said first and second shell means side shell portions extend peripherally about substantially all of that said major shell portion from which they extend so that an interior space occurring between said first and second shell means major shell portions is substantially surrounded by said first and second shell means side shell portions together.

18. The apparatus of claim 9 wherein said second shell means also has side shell portions extending from, and located peripherally about, its said major shell portion in an angular relationship therewith, said first shell means side shell portions adjoining said second shell portions, as aforesaid, at said second shell means side shell portions.

19. The apparatus of claim 10 wherein said first alignment projection extends from a surface of said first shell means major shell portion, and a second alignment projection extends from a surface of said second shell means second major shell portion toward said first shell means, said backing means being positioned at least in part between said first shell means side shell portions and said first and second alignment projections.

20. The apparatus of claim 12 wherein said second distribution of said second kind of magnetic particles is provided substantially in a polymer elongated strip integrally within said surface of said major shell portion of said selected one of said first and second shell means.

21. The apparatus of claim 13 wherein said insert structure contains at least one sheet of visible light transparent material within it.

22. The apparatus of claim 14 wherein said insert structure is adjacent all of said edges of each of said insert openings.

23. The apparatus of claim 16 wherein said interior space is substantially filled with an expanded polymer foam excluding that portion taken by said elongated members.

24. The apparatus of claim 17 wherein said major shell portions of said first and second shell means each have an insert opening provided therein opposite one another with that space between said insert openings being excluded from said interior space, said insert openings having an insert structure placed therein extending between said first and second shell means major shell portions adjacent at least an edge of each of said insert openings.

25. The apparatus of claim 17 wherein said interior space is substantially filled with an expanded polymer foam.

26. The apparatus of claim 17 wherein said interior space has a plurality of elongated members therein each free of any fastening means extending thereinto.

27. The apparatus of claim 18 wherein said first and second shell means side shell portions extend peripherally about substantially all of that said major shell portion from which they extend so that an interior space occurring between said first and second shell means major shell portions is substantially surrounded by said first and second shell means side shell portions together.

28. The apparatus of claim 19 wherein a third alignment projection extends from a surface of said first shell means major shell portion spaced apart from said first alignment projection, and wherein a fourth alignment projection extends from a surface of said second shell means major shell portion spaced apart from said second alignment projection, there being an elongated member positioned substantially between said first and third alignment projections and between said second and fourth alignment projections.

29. The apparatus of claim 22 wherein said interior space is substantially filled with an expanded polymer foam.

30. The apparatus of claim 22 wherein said interior space has a plurality of elongated members therein each free of any fastening means extending thereinto.

31. The apparatus of claim 24 wherein said insert structure is adjacent all of said edges of each of said insert openings.

32. The apparatus of claim 28 wherein a portion of said backing means is positioned between said first and second alignment projections substantially in contact with said elongated member.

33. The apparatus of claim 30 wherein said interior space is substantially filled with an expanded polymer foam.

34. The apparatus of claim 31 wherein said interior space is substantially filled with an expanded polymer foam.

35. The apparatus of claim 31 wherein said interior space has a plurality of elongated members therein each free of any fastening means extending thereinto.

36. The apparatus of claim 35 wherein said interior space is substantially filled with an expanded polymer foam.

37. A door having an exterior substantially of polymeric material useable with magnetic weather stripping, said door comprising:
    first and second shell means each formed of a selected polymer and each having a major shell portion with at least said first shell means also having side shell portions extending from, and located peripherally about, said major shell portion thereof in an angular relationship therewith, said first shell means side shell portions adjoining said second shell means;
    a first distribution of a first type of magnetic particles positioned substantially where said side shell portions of said first shell means adjoin said second shell means as aforesaid; and
    a second distribution of a second kind of magnetic particles substantially positioned near a surface of said major shell portion, of a selected one of said first and second shell means with at least an average value of one parameter describing said magnetic particles of said second kind differing from that average value similarly found for that same parameter describing said magnetic particles of said first kind.

38. The apparatus of claim 37 wherein said parameter is spatial location with respect to at least one selected datum position.

39. The apparatus of claim 37 wherein said parameter is a measure of magnetic particle size.

40. The apparatus of claim 38 wherein said second shell means is fused with said first shell means side shell portions where adjoined to one another to form a substantially continuous polymer fused portion connecting them together, said first distribution occurring substantially within said fused portion.

41. The apparatus of claim 39 wherein an average value of a measure of size of said first kind of magnetic particles differs from an average value of said measure of size of said second kind of magnetic particles to an extent sufficient that electromagnetic energy of selected characteristics applied concurrently to both of said first and second distributions will be absorbed by said first distribution of said first kind of magnetic particles to a much greater extent than it is absorbed in said second distribution of said second kind of magnetic particles.

42. The apparatus of claim 40 wherein second distribution is provided in said first shell means major shell portion adjacent to locations therein from which said side shell portions thereof extend.

43. The apparatus of claim 42 wherein said second shell means also has side shell portions extending from, and located peripherally about, said major shell portion thereof in an angular relationship therewith, said first shell means side shell portions adjoining said second shell portions, as aforesaid, at said second shell means side shell portions.

44. The apparatus of claim 43 wherein said first and second shell means side shell portions extend peripherally about substantially all of that said major shell portion from which they extend.

45. An access limiting means for selectively establishing those fractions of openings in structural walls which can serve as passageways, said access limiting means comprising:
    first and second shell means each formed of a selected polymer and each having a major shell portion with at least said first shell means also having side shell portions extending from, and located peripherally about substantially all of, its said major shell portion thereof in an angular relationship therewith, said second shell means being fused with said first shell means side shell portions to form a substantially continuous polymer fused portion connecting them together; and
    a first distribution of a first type of magnetic particles with said first distribution occurring substantially within said fused portion.

46. The apparatus of claim 45 wherein said second shell means also has side shell portions extending from, and located peripherally about, said major shell portion thereof in an angular relationship therewith, said first shell means side shell portions being fused with said second shell means at said second shell means side shell portions.

47. The apparatus of claim 45 wherein said major shell portions of said first and second shell means each have an insert opening provided therein opposite one another, said insert openings having an insert structure placed therein extending between said first and second shell means major shell portions adjacent at least an edge of each of said insert openings.

48. An access limiting means for selectively establishing those fractions of openings in structural walls which can serve as passageways, said access limiting means comprising:
    first and second shell means each formed of a selected polymer and each having a major shell portion with at least said first shell means also having side shell portions extending from, and located peripherally about substantially all of, said major shell portion thereof in an angular relationship therewith, said second shell means being fused with said first shell means side shell portions to form a substantially continuous polymer fused portion connecting them together so that at least a part of that interior space occurring between said first and second shell means major shell portions is substantially surrounded by said first shell means side shell portions;

a plurality of elongated members in said interior space each free of any fastening of one directly to another; and an expanded polymer foam substantially filling said interior space excluding that portion thereof taken by said elongated members.

49. The apparatus of claim 48 wherein said second shell means also has side shell portions extending from, and located peripherally about, said major shell portion thereof in an angular relationship therewith, said first shell means side shell portions being fused with said second shell means at said second shell means side shell portions.

50. The apparatus of claim 48 wherein said major shell portions of said first and second shell means each have an insert opening provided therein opposite one another, said insert openings having an insert structure placed therein extending between said first and second shell means major shell portions adjacent at least an edge of each of said insert openings.

* * * * *

UNITED STATES PATENT AND TRADEMARK OFFICE
CERTIFICATE OF CORRECTION

PATENT NO. : 5,077,948
DATED      : January 7, 1992
INVENTOR(S): Vernon D. Olson et al.

It is certified that error appears in the above-identified patent and that said Letters Patent is hereby corrected as shown below:

```
        Col. 11, line 4, delete "claim" and insert
--claim 11--.
        Col. 12, line 18, after "about,", delete "its".
        Col. 12, line 18-19, after "portion", insert
--thereof--.
```

Signed and Sealed this

Eighteenth Day of May, 1993

Attest:

MICHAEL K. KIRK

*Attesting Officer*      Acting Commissioner of Patents and Trademarks